ns
3,708,591
Patented Jan. 2, 1973

3,708,591
CERTAIN FORMYLHYDRAZONES USED AS APHICIDES
Horst O. Bayer, Levittown, and William S. Hurt, Norristown, Pa., assignors to Rohm and Haas Company, Philadelphia, Pa.
No Drawing. Filed Mar. 18, 1970, Ser. No. 20,863
Int. Cl. A01n *9/20*
U.S. Cl. 424—327      3 Claims

ABSTRACT OF THE DISCLOSURE

Compositions and methods for controlling aphids and mites, which comprises a compound of the formula:

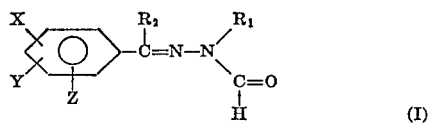

wherein X, Y, and Z are individually selected from one of hydrogen, alkyl of one to three carbons; halogen, such as fluoro, chloro, iodo, and bromo; but they are not all hydrogen concurrently. $R_1$ and $R_2$ are selected from one of hydrogen and alkyl of one to three carbons.

---

This invention relates to pesticidal compositions useful against specific insects and mites. In another aspect, it relates to methods of combatting specific insects such as aphids, and mites.

We have discovered that compositions containing relatively small proportions of ring substituted aryl-2-formylhydrazones, are highly effective in combating infestations particularly of aphids, and also mites and larvae of Lepidoptera, which are injurious to plants of agronomic value.

The toxicants of the present invention may be represented by the general formula:

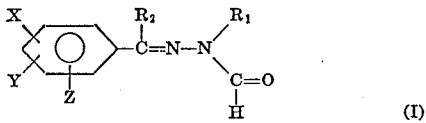

wherein X, Y and Z are individually selected from one of hydrogen; alkyl from one to three carbons; halogen, such as fluoro, chloro, iodo, and bromo; but they are not all hydrogen concurrently. $R_1$ and $R_2$ are selected from one of hydrogen and alkyl from one to three carbons.

It is preferred to use as the active ingredient of the present compositions, an optionally halogenated compound of the Formula I in which $R_2$ is hydrogen; and X' and Y' and Z' are limited to one of hydrogen, bromo, fluoro, or chloro, preferably the latter, but they are not all hydrogen concurrently; and $R_3$ is hydrogen or methyl, preferably the latter, resulting in the Formula II below:

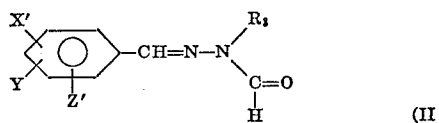

The most advantageous novel compounds are those of Formula II as:

4-chlorobenzaldehyde-2'-methyl-2'-formylhydrazone
4-bromobenzaldehyde-2'-methyl-2'-formylhydrazone
4-fluorobenzaldehyde-2'-methyl-2'-formylhydrazone
4-chlorobenzaldehyde-2'-formylhydrazone
2,4-dichlorobenzaldehyde-2'-methyl-2'-formylhydrazone
3,4-dichlorobenzaldehyde-2'-methyl-2'-formylhydrazone
2,4,5-trichlorobenzaldehyde-2'-methyl-2'-formylhydrazone To the best of our knowledge, the compounds of the above formulae have only been generally disclosed in the literature, but no biocidal activity of any type has been attributed to them.

French Patent 1,572,191 (1967) discloses insecticidal and/or acaricidal analogs of the present compounds, but not those of selective aphicidal properties. Indeed, the here claimed compounds have shown striking superiority over typical of these prior art acetylhydrazones. Data is provided in the tables for these prior art compounds designated as Examples A, B, and C.[1]

Finally, a p-nitro analogue of one of the preferred compounds of Formula II herein; namely, 4-nitrobenzaldehyde-2'-methyl-2'-formylhydrazone was reported by H. Dorn et al. in Chem. Ber., 98, 3377 (1965). This compound, designated as Example D in the table, was made and tested in the presently disclosed bioassays, and found to be inactive as an aphicide and miticide.

Toxicants of the present invention wherein $R_1$ is lower alkyl, and $R_2$ is hydrogen, may be prepared by reacting a mono-, di-, tri-substituted benzaldehyde with an appropriately substituted hydrazine, such as 2-methyl-2-formylhydrazine, in the presence of a neutral solvent, optionally with an added catalyst under mild conditions to yield typically the corresponding X, Y, Z-substituted benzaldehyde-2'-alkyl-2'-formylhydrazone.

Compounds of this invention wherein $R_1$ is H or alkyl and $R_2$ is alkyl are readily prepared by reacting a mono-, di, or tri-ring substituted acetophenone-hydrazone with a formylating agent, such as acetic- formic anhydride, in the presence of a neutral solvent at 10 to 15° C. to yield the corresponding derivative X, Y, Z-substituted acetophenone-2'-formylhydrazone.

Compounds of claim 1 wherein at least one phenyl ring substituent is halo, another is alkyl, and the last is H; and $R_2$ is hydrogen; are prepared by reacting a monohalomonoalkyl substituted benzaldehyde, such as 2-methyl-4-chlorobenzaldehyde with 2-methyl-2-formylhydrazine to yield the corresponding 2-methyl-4-chlorobenzaldehyde-2'-methyl-2'-formylhydrazone.

Examples of specific compounds falling within Formulas I and II are:

4-chlorobenzaldehyde-2'-methyl-2'-formylhydrazone
4-chlorobenzaldehyde-2'-ethyl-2'-formylhydrazone
3-chlorobenzaldehyde-2'-methyl-2'-formylhydrazone
2-chlorobenzaldehyde-2'-methyl-2'-formylhydrazone
2-chlorobenzaldehyde-2'-propyl-2'-formylhydrazone
2-chlorobenzaldehyde-2'-isopropyl-2'-formylhydrazone
4-bromobenzaldehyde-2'-methyl-2'-formylhydrazone
4-bromobenzaldehyde-2'-ethyl-2'-formylhydrazone
4-bromobenzaldehyde-2'-propyl-2'-formylhydrazone
4-fluorobenzaldehyde-2'-methyl-2'-formylhydrazone
4-fluorobenzaldehyde-2'-formylhydrazone
4-chlorobenzaldehyde-2'-formylhydrazone
2-chlorobenzaldehyde-2'-formylhydrazone
3-chlorobenzaldehyde-2'-formylhydrazone
2,4-dichlorobenzaldehyde-2'-methyl-2'-formylhydrazone
2,5-dichlorobenzaldehyde-2'-ethyl-2'-formylhydrazone
2,6-dichlorobenzaldehyde-2'-methyl-2'-formylhydrazone
3,4-dichlorobenzaldehyde-2'-methyl-2'-formylhydrazone
2,3-dichlorobenzaldehyde-2'-ethyl-2'-formylhydrazone ---
[1] (A) 4-chlorobenzaldehyde-2'-acetylhydrazone; (B) 2,4-dichlorobenzaldehyde-2'-acetylhydrazone; (C) 2,4-dichlorobenzaldehyde-2'-methyl-2'-acetylhydrazone.

3,5-dichlorobenzaldehyde-2'-methyl-2'-formylhydrazone
2-bromobenzaldehyde-2'-methyl-2'-formylhydrazone
3-bromobenzaldehyde-2'-ethyl-2'-formylhydrazone
3-bromobenzaldehyde-2'-methyl-2'-formylhydrazone
2-bromobenzaldehyde-2'-ethyl-2'-formylhydrazone
2-fluorobenzaldehyde-2'-methyl-2'-formylhydrazone
3-fluorobenzaldehyde-2'-methyl-2'-formylhydrazone
4-bromobenzaldehyde-2'-formylhydrazone
2,4-difluorobenzaldehyde-2'-methyl-2'-formylhydrazone
3,4-difluorobenzaldehyde-2'-ethyl-2'-formylhydrazone
3,4-difluorobenzaldehyde-2'-methyl-2'-formylhydrazone
3,4-difluorobenzaldehyde-2'-propyl-2'-formylhydrazone
2,4-dibromobenzaldehyde-2'-methyl-2'-formylhydrazone
2,4-dibromobenzaldehyde-2'-ethyl-2'-formylhydrazone
2,5-dibromobenzaldehyde-2'-methyl-2'-formylhydrazone
2,4-dibromobenzaldehyde-2'-isopropyl-2'-formylhydrazone
2-bromo-4-chlorobenzaldehyde-2'-methyl-2'-formylhydrazone
4-bromo-2-chlorobenzaldehyde-2'-methyl-2'-formylhydrazone
3-bromo-4-chlorobenzaldehyde-2'-methyl-2'-formylhydrazone
4-bromo-3-chlorobenzaldehyde-2'-methyl-2'-formylhydrazone
2-chloro-4-fluorobenzaldehyde-2'-methyl-2'-formylhydrazone
4-chloro-2-fluorobenzaldehyde-2'-methyl-2'-formylhydrazone
2-bromo-4-fluorobenzaldehyde-2'-methyl-2'-formylhydrazone
2,4-dichloro-5-fluorobenzaldehyde-2'-methyl-2'-formylhydrazone
2,4-dichloro-6-fluorobenzaldehyde-2'-methyl-2'-formylhydrazone
4-bromo-2-methylbenzaldehyde-2'-methyl-2'-formylhydrazone
4-fluoro-2-methylbenzaldehyde-2'-methyl-2'-formylhydrazone
2,4,5-trichlorobenzaldehyde-2'-methyl-2'-formylhydrazone
3,4,5-trichlorobenzaldehyde-2'-methyl-2'-formylhydrazone
2,3,4-trichlorobenzaldehyde-2'-methyl-2'-formylhydrazone
2,4,6-trichlorobenzaldehyde-2'-methyl-2'-formylhydrazone
2,4-dichloroacetophenone-2'-methyl-2'-formylhydrazone
2,4-dichloroacetophenone-2'-ethyl-2'-formylhydrazone
2,4-dichloroacetophenone-2'-propyl-2'-formylhydrazone
2,4-dichloroacetophenone-2'-isopropyl-2'-formylhydrazone
3,4-dichloroacetophenone-2'-methyl-2'-formylhydrazone
3,4-dichloroacetophenone-2'-ethyl-2'-formylhydrazone
3,4-dichloroacetophenone-2'-propyl-2'-formylhydrazone
3,4-dichloroacetophenone-2'-isopropyl-2'-formylhydrazone
2,4,5-trichloroacetophenone-2'-methyl-2'-formylhydrazone
2,4,5-trichloroacetophenone-2'-ethyl-2'-formylhydrazone
2,4,5-trichloroacetophenone-2'-propyl-2'-formylhydrazone
2,4,5-trichloroacetophenone-2'-isopropyl-2'-formylhydrazone
4-chloroacetophenone-2'-methyl-2'-formylhydrazone
4-chloroacetophenone-2'-ethyl-2'-formylhydrazone
4-chloroacetophenone-2'-propyl-2'-formylhydrazone
4-chloroacetophenone-2'-isopropyl-2'-formylhydrazone
2-methyl-4-chlorobenzaldehyde-2'-methyl-2'-formylhydrazone
2-methyl-4,6-dichlorobenzaldehyde-2'-methyl-2'-formylhydrazone
2-methyl-4,6-dichlorobenzaldehyde-2'-formylhydrazone The foregoing gives tabulations of exemplary compounds of Formulae I and II, and their characterization. Specifically, illustrative preparations of the following examples are set forth below:

EXAMPLE I

Preparation of 4-chlorobenzaldehyde-2'-methyl-2'-formylhydrazine, I 2-methyl-2-formylhydrazine, 4.4 g. (0.06 mole) is added with stirring to a solution of 7.7 g. (0.055 mole) p-chloro benzaldehyde in 100 ml. of methanol. There is no exotherm. Then 3.6 g. (0.06 mole) glacial acetic acid is added. There is a slight exotherm (7°) and a solid begins to form within three minutes. The slurry is stirred for an additional 3 hours and the solid is collected by filtration, washed with methanol and dried to give 8.6 g. (80%) of the compound as colorless crystals, M.P. 158–160° C.

*Analysis.*—Found (calculated) for $C_9H_9ClN_2O$ (percent): C, 55.2 (55.0); H, 4.7 (4.6); N, 14.3 (14.2); Cl, 17.9 (18.0).

EXAMPLE II

Preparation of monosubstituted benzaldehyde-2'-methyl-2'-formylhydrazones, II

Using the procedure detailed in Example I, when the following substituted benzaldehydes are substituted for the p-chlorobenzaldehyde of said example, the corresponding listed products are obtained:

| Starting material: | Product [1] |
|---|---|
| o-Chlorobenzaldehyde | (IIa) 2 - chlorobenzaldehyde - 2' - methyl-2' - formylhydrazone M.P. 71–72° C. |
| p-Bromobenzaldehyde | (IIb) 4 - bromobenzaldehyde - 2' - methyl-2' - formylhydrazone M.P. 160–161.5° C. |
| p-Fluorobenzaldehyde | (IIc) 4 - fluorobenzaldehyde - 2' - methyl-2' - formylhydrazone M.P. 115–116° C. |
| m-Chlorobenzaldehyde | (IId) 3 - chlorobenzaldehyde - 2' - methyl-2' - formylhydrazone M.P. 122–124° C. |

[1] Satisfactory Elemental Analyses were obtained for all examples.

EXAMPLE III

Preparation of 2,4-dichlorobenzaldehyde-2'-methyl-2'-formylhydrazone, III 2-methyl-2-formylhydrazine, 4.4 g. (0.06 mole) is added with stirring at room temperature to a solution of 10.5 g. (0.06 mole) 2,4-dichlorobenzaldehyde in 200 ml. of methanol. There is no exotherm. Then 3.6 g. (0.06 mole) glacial acetic acid is added. Again there is no exotherm. The clear solution is left standing overnight at room temperature, and then concentrated in vacuo, to give 11.7 g. (85%) of crude III as a cream colored solid; M.P. 93–99° C. Recrystallization from methanol gives 8.0 g. (58%) of III as colorless needles; M.P. 107–108.5° C.

*Analysis.*—Found (calculated) for $C_9H_8Cl_2N_2O$ (percent): C, 47.1 (46.8); H, 3.4 (3.5); N, 12.1 (12.1); Cl, 30.4 (30.7).

EXAMPLE IV

Preparation of 3,4-dichlorobenzaldehyde-2'-methyl-2'-formylhydrazone, IV 2-methyl-2-formylhydrazine, 4.4 g. (0.06 mole) is added with stirring at room temperature to a solution of 10.5 g. (0.06 mole) 3,4-dichlorobenzaldehyde in 150 ml.

of methanol. There is a slight exotherm (4° C.) and a precipitate begins to form. The slurry is stirred an additional hour at room temperature and the solid is collected by filtration, washed with methanol, and dried to give 10.1 g. (73%) of IV as colorless crystals, M.P. 132–133° C.

Analysis.—Found (calculated) for $C_9H_8Cl_2O_2$ (percent): C, 46.5 (46.8); H, 3.6 (3.5); N, 12.0 (12.1); Cl, 30.7 (30.7).

EXAMPLE V

Preparation of 2,4,5-trichlorobenzaldehyde-2'-methyl-2'-formylhydrazone, V 2-methyl-2-formylhydrazine, 0.75 g. (0.01 mole) in 10 ml. of methanol is added with stirring to a solution of 4.0 g. (0.019 mole) 2,4,5-trichlorobenzaldehyde in 50 ml. of methanol. There is no exotherm or precipitation. After standing overnight at room temperature, a precipitate had formed. This is collected by filtration, washed with methanol and dried to give 0.9 g. (34%) of V as colorless crystals, M.P. 116–120° C.

Analysis.—Found (calculated) for $C_9H_7Cl_3N_2O$ (percent): C, 40.8 (40.7); H, 2.7 (2.7); N, 10.3 (10.5); Cl, 41.3 (40.1).

EXAMPLE VI

Preparation of 2,4,6-trichlorobenzaldehyde-2'-methyl-2'-formylhydrazone, VI

This compound was prepared as in V, using 2,4,6-trichlorobenzaldehyde as the appropriate reagent, M.P. 116.5–119.5° C.

EXAMPLE VII

Preparation of 4-chlorobenzaldehyde-2'-formylhydrazone, VII

Formylhydrazine, 3.6 g. (0.06 mole) in 25 ml. of methanol is added with stirring at room temperature, to a solution of 7.7 g. (0.055 mole) p-chlorobenzaldehyde in 100 ml. of methanol. There is a slight exotherm (3°), and a solid begins to form after a third of the hydrazine has been added. The slurry is stirred for an additional two hours, and the solid is collected by filtration, washed with methanol, and dried to give 3.8 g. (38%) of the desired formylhydrazone, as colorless crystals, M.P. 184–185° C.

Analysis.—Found (calculated) for $C_8H_7ClN_2O$ (percent): C, 52.4 (52.6); H, 3.9 (3.9); N, 15.1 (15.3); Cl, 19.3 (19.4).

EXAMPLE VIII

Preparation of 2,4-dichlorobenzaldehyde-2'-formylhydrazone, VIII

This is prepared by the method of Ex. VII using 3.6 g. (0.06 mole) of formylhydrazine, 10.5 g. (0.06 mole) 2,4-dichlorobenzaldehyde, and 250 ml. methanol, to give 9.0 g. as colorless crystals, M.P. 194–196° C.

Analysis.—Found (calculated) for $C_8H_6Cl_2N_2O$ (percent): C, 44.1 (44.3); H, 2.7 (2.8); N, 12.6 (12.9); Cl, 33.2 (32.7).

EXAMPLE IX

Preparation of 4-chloroacetophenone-2'-formylhydrazone, IX (a) Preparation of 4-chloroacetophenone hydrazone intermediate.—4-chloroacetophenone, 15.45 g. (0.10 mole) in 20 ml. of ethanol is added, with stirring at room temperature, to a solution of 3.2 g. (0.10 mole) anhydrous hydrazine in 120 ml. of ethanol. The solution is stirred for an hour at room temperature, and then brought to reflux for 3 hours.

The solution is then allowed to stand at room temperature overnight, whereupon crystallization will occur. The crystals are collected by filtration, washed with methanol, and dried to give 3.5 g. (21%) of the desired hydrazone, as a pale green crystalline solid; M.P. 49–51° C.

(b) Preparation of the end product.—Acetic-formic anhydride (prepared from a two to one by volume, mixture of acetic anhydride and formic acid), 7.5 g. (0.05 mole) in 10 ml. of benzene is added with stirring at 10–15° C. to a solution of 6.75 g. (0.04 mole) 4-chloroacetophenone hydrazone in 100 ml. of benzene. A precipitate begins to form shortly after the addition is started. The slurry is stirred an additional hour at 10–15° C., and then is concentrated in vacuo to a volume of 40 ml. The crystals are collected by filtration, washed with benzene, and dried, to give 3.2 g. (41%) of IX as colorless crystals, M.P. 192–195° C.

Analysis.—Found (calculated) for $C_9H_9ClN_2O$ (percent): C, 55.1 (55.0); H, 4.7 (4.6); N, 14.2 (14.3); Cl, 18.1 (18.0).

EXAMPLE X

Preparation of 2-methyl-4-chlorobenzaldehyde-2'-methyl-2'-formylhydrazone, X 2-methyl-2-formylhydrazine, 4.4 g. (0.06 mole) in 10 ml. of methanol is added at room temperature to a solution of 9.34 g. (0.06 mole) 2-methyl-4-chlorobenzaldehyde in 150 ml. of methanol. After 5 minutes, a white precipitate begins to form. The solution is stirred an additional hour, and the solid is collected by filtration, washed with methanol, and dried to give 5.6 g. (45%) of Compound X as colorless crystals, M.P. 149–152° C.

Analysis.—Found (calculated) for $C_{10}H_{11}ClN_2O$ (percent): C, 56.9 (57.0); H, 5.3 (5.3); N, 13.2 (13.3); Cl, 16.6 (16.8).

EXAMPLE XI

Preparation of 4-chloro-acetophenone-2'-methyl-2'-formylhydrazone XI (a) Preparation of the 4-chloro-acetophenone-2'-methylhydrazone intermediate.—Methylhydrazine 4.6 g. (0.10 mole) is added at room temperature to a solution of 15.45 g. (0.10 mole) 4-chloroacetophenone in 150 ml. of ethanol. The solution is brought to reflux for 24 hours and then concentrated in vacuo, to give the desired intermediate as a yellow oil of suitable purity for the following reaction.

(b) Preparation of the end product.—Acetic-formic anhydride (prepared from a 2: by volume mixture of acetic anhydride and formic acid) 22.2 g. (0.15 mole), is added with stirring at 10–15° C. to a solution of the hydrazone intermediate prepared above in 150 ml. of benzene. The solution is maintained at 10–15° C. for one hour, and is then allowed to stand overnight at room temperature. The solution is concentrated in vacuo, to give 17.1 g. of XI as a yellow oil. A benzene solution of 7 g. of this oil is chromatographed on 40 g. of silica gel to give 2.6 g. of XI as colorless crystals; M.P. 56.5–58.5° C.

Initial evaluations were made on the following mites, aphids, and insects:

| Code symbol | Common name | Latin name |
|---|---|---|
| TSM | Two-spotted spider mite | Tetranychus urticae. |
| GPA | Green peach aphid | Myzus persicae. |
| PA | Pea aphid | Acyrthosiphon pisum. |
| BB | Mexican bean beetle | Epilachna varivestis. |
| AW | Southern armyworm | Prodenia eridania. |
| CRW | Southern corn rootworm | Diabrotica undecimpunctata howardi. |
| HF | House fly | Musca domestica. |

A test solution containing 600 p.p.m. (or 1200 p.p.m.) was made by dissolving the test compound in a solvent (acetone:methanol, 1:1), adding surfactant and then water to give an acetone:methanol:$H_2O$ system of 10:10:80. A 1:1 mixture of an alkylaryl-polyether alcohol (sold under the trademark Triton X-155) and a modified phthalic glycerol alkyd resin (sold under the trademarked name of Triton B-1956) was utilized at the equivalent of 1 ounce per 100 gal. of test solution as a surfactant.

For green peach aphid tests, infested broccoli (*Brassica oleracea italica*) plants containing about 200 aphids were sprayed manually to run off with the test solution. They were held for 48 hours and then the percent kill of aphids was determined.

For the pea aphid test, broad bean (*Vicia faba*) plants pruned to 2 leaves were sprayed manually to run off and allowed to dry. These were placed horizontally in plastic boxes (5 x 7.5 x 3.5 inches) and infested with 50–100 aphids, predominantly adults. The boxes were covered with lids containing screened ventilation holes. After 48 hours, the percent kill of aphids was determined.

For the mite test, infested bean (*Phaseolus limeanus*) leaf discs (1.25 inches in diameter) containing about 50 mites were placed in a Petri dish lid on moistened cotton and were then sprayed with the test solution using a rotating turntable. After 24 hours, the percent mite kill was determined.

For the bean beetle larvae test, the lower surface of the detached whole bean leaves were sprayed as above for the mite test and allowed to dry. Each leaf was transferred to an unsprayed dish containing moistened filter paper, and infested with 10 third instar Mexican bean beetle larvae. The dishes were covered. After holding for 48 hours, the percent kill of the larvae was obtained.

In the adult bean beetle tests, ten insects were sprayed on the turntable and held in closed containers for 48 hours. The percent kill of beetles was then determined.

For the armyworm larvae test, 10 third instar larvae were placed in a Petri dish on a piece of moistened filter paper. After the dish was sprayed with the test solution, using a rotating turntable, an unsprayed detached whole bean leaf was placed in the dish. The dishes were covered. After holding for 48 hours, the percent kill of larvae was obtained.

For mite tests involving the two-spotted mite larvae, bean leaf sections containing about 100 eggs were placed on moistened cotton in a Petri dish, and sprayed on the turntable above. These were held for 6 days and examined under the microscope. Dead and live larvae were counted, and the percent larvacidal activity was determined.

For tests on house fly larvae, two layers of 4.25 cm. filter papers were placed in small Petri dishes which were then sprayed on the turntable and air dried. About 100 eggs of the house fly in about 1 ml. of water were pipetted onto the filter paper and the dishes covered. These were held for 24 hours and examined under the microscope. The percent kill values for larvae were determined.

For tests involving the corn rootworm, ova and larvae, the same technique as described above for house fly larvae (turntable method) was used. The holding period was 6 days. Unhatched eggs and dead and live larvae were counted under the microscope, and the percent ovicidal and the percent larvacidal activity were determined.

Table I gives the results of the above biological investigations conducted on representative compounds of the present invention. It will be readily seen from these data, those compounds falling within the scope of this invention are endowed with particularly good aphicidal properties.

The activity against the representative two-spotted mite indicates broader spectrum activity, extending to the order Acarina, which includes mites and ticks.

The good activity against southern armyworm indicates broader spectrum activity extending to the insect order Lepidoptera.

The negative responses shown by the bean beetle larvae and adults, and house fly larvae are of especial interest. These species are taxonomically related to aphid predators, belonging to the order Coleoptera and Diptera, respectively. Thus, these novel aphicides are not likely to depress the available population of such beneficial insects, where aphids are the dominant pest.

TABLE I.—INSECTICIDAL AND MITICIDAL KILL DATA
[Percent control]

| | GPA | PA | BB | | AW | TSM | | CRW | | HF |
| | | | Adult | Larvae | Larvae | Adult | Larvae | Ova | Larvae | larvae |
|---|---|---|---|---|---|---|---|---|---|---|
| P.p.m. | 600 | 600 | 600 | 1,200 | 600 | 1,200 | 1,200 | 1,200/600 | 1,200/600 | 1,200 |
| Example: | | | | | | | | | | |
| I | 100 | 100 | 0 | 0 | 90 | 0 | [1] 100 | 100/100 | [2] | 0 |
| IIa | 77 | 83 | 0 | 0 | 0 | 0 | 0 | 100/0 | [2]/100 | 0 |
| IIb | 100 | 78 | 0 | 0 | 60 | 0 | 90 | 100/72 | [2]/0 | 0 |
| IIc | 85 | 47 | 0 | 10 | 90 | 85 | 0 | 100/85 | [2]/0 | 90 |
| IId | 100 | 93 | 0 | 0 | 0 | 0 | 0 | 0/0 | 79/59 | 0 |
| III | 100 | 100 | 0 | 0 | 100 | 100 | [3] 100 | 94/77 | 100 100 | [4] 100 |
| IV | 100 | 79 | 0 | 0 | 70 | 0 | 60 | 94/90 | 100/100 | 0 |
| V | 100 | 86 | 0 | 0 | 0 | 0 | [3] 100 | 0/0 | 100/100 | 0 |
| VI | 94 | 0 | 0 | 0 | 0 | 0 | 0 | 0/0 | 100/100 | 0 |
| VII | 100 | 73 | 0 | 0 | 80 | 0 | 0 | 59/78 | 100/0 | 0 |
| VIII | 100 | 0 | [5] | 0 | [5] | 0 | 0 | [5] | [5] | 0 |
| IX | 99 | 40 | [5] | 0 | [5] | 0 | 0 | 0/0 | 100/71 | 50 |
| X | 87 | 0 | 0 | 0 | 0 | 0 | 0 | 49/[5] | 70/[5] | 0 |
| A | 100 | 54 | 0 | 0 | 100 | 0 | 0 | 100/79 | [2]/0 | 0 |
| B | 84 | 0 | [5] | 0 | [5] | 0 | 0 | 0/0 | 100/0 | 0 |
| C | 87 | 42 | [5] | 0 | [5] | 0 | 50 | 0/0 | 100/0 | 0 |
| D | [6] 0 | 0 | 0 | [6] 0 | 100 | [6] 0 | 0/[5] | 0/[5] | 0/[5] | 0 |

[1] Compound I had 0% control at 600 p.p.m.
[2] No count possible.
[3] Compounds III and V showed 100% control at 600 p.p.m.
[4] Compound III had 0% control at 600 p.p.m.
[5] Not tested.
[6] At 1,000 p.p.m.

Additional biological data; i.e., concentrations in p.p.m., lethal to 95% and/or 50% of selected pests are presented for two presently preferred compounds of the invention, as well as for certain prior art compounds. These $LC_{95}$ and/or $LC_{50}$ values are derived from eye-fitted lines best characterizing mortality vs. concentration plots on logarithmic probability paper. Test methods employed have been described previously. The values are presented in Table II.

Again, the very clear and unexpected superiority of compounds III and IV over the prior art compounds, A, B and C is evident, most especially as to comparative aphicidal activity.

TABLE II.—INSECTICIDAL AND MITICIDAL $LC_{95}$ AND/OR $LC_{50}$ VALUES FOR SELECTED COMPOUNDS, P.P.M.

| | GPA | | PA | | TSM (adult), $LC_{50}$ | CRW, ova | $LC_{50}$, larvae |
|---|---|---|---|---|---|---|---|
| | $LC_{50}$ | $LC_{95}$ | $LC_{50}$ | $LC_{95}$ | | | |
| Example: | | | | | | | |
| III | 1.3 | 14 | 21 | 120 | [1] 500 | 470 | 195 |
| IV | 1.7 | 9 | 170 | 1,500 | >1,200 | 220 | 150 |
| A | 12 | 88 | 320 | 1,450 | >1,200 | 490 | >600 |
| B | 22 | 1,200 | >1,200 | >1,200 | >1,200 | >1,200 | 850 |
| C | 35 | 750 | 800 | 3,000 | >1,200 | >1,200 | 850 |

[1] When exposure is increased from 24 to 48 hrs. the $LC_{50}$ is 300 p.p.m.

The compounds of this invention may be utilized as the sole biocidal agents or they may be employed in conjunction with other bactericides, fungicides, herbicides, insecticides, miticides, and comparable pesticides.

These compounds are desirably characterized by moderate to low mammalian toxicity. For example, 4-chlorobenzaldehyde-2'-methyl-2'-formylhydrazone has an acute oral $LD_{50}$ in albino rats of 1700 mg./kg., while 2,4-dichlorobenzaldehyde-2'-methyl-2'-formylhydrazone has an acute oral $LD_{50}$ of 310 mg./kg.

For use as pesticides, the compounds of this invention may be used as solutions in organic solvents or formulations. For example, they may be formulated as wettable powders, emulsifiable concentrates, dusts, granular formulations or flowable emulsifiable concentrates. In such formulations, the formyl hydrazones are extended with an agronomically acceptable liquid or solid carrier and, when desired, suitable surfactants are likewise incorporated. Surfactants commonly used in the art may be found in the John W. McCutcheon, Inc. publication "Detergents and Emulsifiers 1967 Annual."

The disclosed compounds may be taken up on or mixed with a finely particled solid carrier, as for example, clays, inorganic silicates, carbonates, and silicas. Organic carriers may also be employed. Dust concentrates are commonly made wherein formyl hydrazones are present in the range of 20 to 80%. For ultimate applications, these concentrates are normally extended with additional solid to give an active ingredient content of from about 1 to 20%. Granular formulations are made using a granular or pelletized form of carrier, such as granular clays, vermiculite, charcoal or corn cobs, and may contain the active ingredient in from 1 to 25% by weight.

Wettable powder formulations are made by incorporating the compounds of this invention in an inert, finely divided solid carrier along with a surfactant which may be one or more emulsifying, wetting, dispersing or spreading agents or blend of these.

The formyl hydrazones are usually present in the range of 10 to 80% by weight and surfactants in from 0.5 to 10% by weight.

One convenient method for preparing a solid formulation is to impregnate the hydrazone toxicant onto the solid carrier by means of a volatile solvent, such as acetone. In this manner, adjuvants, such as activators, adhesives, plant nutrients, synergists and various surfacants may also be incorporated.

Emulsifiable concentrate formulations may be prepared by dissolving the hydrazones of this invention in an agronomically acceptable organic solvent and adding a solvent-soluble emulsifying agent. Suitable solvents are usually water-immiscible and may be found in the hydrocarbon, chlorinated hydrocarbon, ketone, ester, alcohol and amide classes of organic solvents. Mixtures of solvent are commonly employed. The surfactants useful as emulsifying agents may constitute about 0.5 to 10% by weight of emulsifiable concentrate and may be anionic, cationic or non-ionic in character. The concentration of the active ingredients may vary from 10 to 80%, preferably in the range of 25 to 50%.

For use as biocidal agents, these compounds should be applied in an effective amount sufficient to exert the desired biocidal activity by techniques well known in the art. Usually, this will involve the application of the compositions to the loci to be protected or eradicated in an effective amount when incorporated in an agronomically acceptable carrier. However, in certain situations, it may be desirable and advantageous to apply the compounds directly onto the loci to be protected or eradicated without the benefit of any substantial amount of carrier. This is a particularly effective method when the physical nature of the toxicants is such as to permit what is known as "low-volume" application, that is, when the compounds are in liquid form or substantially soluble in higher boiling solvents.

The application rate will, of course, vary depending upon the purposes for such application, the particular formyl hydrazone being utilized, the frequency of dissemination and the like.

For use as insecticides and miticides, dilute sprays may be applied at concentrations of 0.001 to 20 pounds of the active hydrazone ingredient per 100 gallons of spray. They are usually applied to 0.01 to 5 pounds per 100 gallons and preferably at 0.03 to 1 pound per 100 gallons. In more concentrated sprays, the active ingredient is increased by a factor of 2 to 12. With dilute sprays, applications are usually made to the plants until run-off is achieved, whereas with more concentrated or low-volume sprays the materials are applied as mists.

For use as a soil insecticide, the hydrazones may be applied as a solid formulation, preferably a granular formulation, by broadcasting, by side-dressing, by soil incorporation or by seed treatment. The application rate may amount to from 1 to 50 pounds per acre. For soil incorporation, the compounds of this invention may be mixed with the soil at a rate of 2 to 100 p.p.m.

I claim:

1. A method for controlling aphids which comprises applying to plants to be protected or freed from these pests an aphicidally effective amount of a compound of the formula:

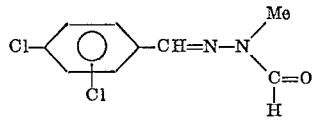

2. A method according to claim 1 wherein the compound is 2,4-dichlorobenzaldehyde-2'-methyl-2'-formylhydrazone.

3. A method according to claim 1 wherein the compound is 3,4-dichlorobenzaldehyde-2'-methyl-2'-formylhydrazone.

References Cited

UNITED STATES PATENTS

| 3,060,192 | 10/1962 | Bernstein et al. | 260—562 X |
| 3,178,476 | 4/1965 | Hegedüs et al. | 260—562 |
| 3,235,447 | 2/1966 | Urbschat et al. | 424—327 X |

FOREIGN PATENTS

| 1,572,191 | 5/1969 | France. |

L. SCHENKMAN, Assistant Examiner